US010057318B1

(12) United States Patent
Rashid et al.

(10) Patent No.: US 10,057,318 B1
(45) Date of Patent: *Aug. 21, 2018

(54) SYSTEM, METHOD, AND COMPUTER PROGRAM FOR ENABLING A USER TO ACCESS AND EDIT VIA A VIRTUAL DRIVE OBJECTS SYNCHRONIZED TO A PLURALITY OF SYNCHRONIZATION CLIENTS

(75) Inventors: Fuad Rashid, Foster City, CA (US); Michael Phillip Morford, San Ramon, CA (US); Eric Wayne Wagner, San Francisco, CA (US); James David Wong, San Jose, CA (US); Sing Yip, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/571,512

(22) Filed: Aug. 10, 2012

(51) Int. Cl.
*G06F 3/048* (2013.01)
*G06F 17/30* (2006.01)
*G06F 3/00* (2006.01)
*H04L 29/08* (2006.01)

(52) U.S. Cl.
CPC ............... *H04L 67/00* (2013.01); *G06F 3/048* (2013.01); *G06F 3/00* (2013.01); *G06F 17/30* (2013.01)

(58) Field of Classification Search
CPC .......... G06F 3/048; G06F 17/30; G06F 15/16; G06F 3/00; G06F 17/00; G06F 21/00; H04L 67/00
USPC .......................................... 715/738; 709/219
See application file for complete search history.

(56) References Cited

U.S. PATENT DOCUMENTS

| | | |
|---|---|---|
| 5,862,346 A | 1/1999 | Kley et al. |
| 6,348,932 B1 | 2/2002 | Nishikawa et al. |
| 6,407,750 B1 | 6/2002 | Gioscia et al. |
| 6,636,873 B1 | 10/2003 | Carini et al. |
| 6,636,888 B1 | 10/2003 | Bookspan et al. |
| 6,904,185 B1 | 6/2005 | Wilkins et al. |
| 7,039,723 B2 | 5/2006 | Hu et al. |
| 7,103,357 B2 | 9/2006 | Kirani et al. |
| 7,139,555 B2 | 11/2006 | Apfel |

(Continued)

OTHER PUBLICATIONS

Jmans25, Map/Mount Dropbox as a network drive, Oct. 14, 2011, Youtube, p. 1.*

(Continued)

*Primary Examiner* — Hugo Molina
(74) *Attorney, Agent, or Firm* — Keller Jolley Preece

(57) ABSTRACT

A system, method, and computer program are provided for enabling a user to edit and access local and remote objects via a virtual drive, including objects synchronized to a plurality of synchronization clients. A virtual drive is displayed on the user's local client device with all objects, which a user has synchronized to a synchronization server. A user is able to access and edit any object displayed in the virtual drive. In response to detecting a change in an object in the virtual drive, the object is updated on the synchronization server. All remote clients of the user or of any other users whom have access to the changed folder are identified and notified of the change. In response to the change being a change to content within the folder, the content of the folder is automatically updated on any identified remote clients that have a corresponding folder.

14 Claims, 10 Drawing Sheets

(56) References Cited

U.S. PATENT DOCUMENTS

| | | | |
|---|---|---|---|
| 7,319,536 B1 | 1/2008 | Wilkins et al. | |
| 7,321,919 B2 | 1/2008 | Jacobs et al. | |
| 7,369,161 B2 | 5/2008 | Easwar et al. | |
| 7,372,485 B1 | 5/2008 | Bodnar et al. | |
| 7,441,180 B1 | 10/2008 | Kaczmarek et al. | |
| 7,502,795 B1 | 3/2009 | Svendsen et al. | |
| 7,576,752 B1 | 8/2009 | Benson et al. | |
| 7,680,067 B2 | 3/2010 | Prasad et al. | |
| 7,707,500 B2 | 4/2010 | Martinez | |
| 7,747,596 B2 | 6/2010 | Bigioi et al. | |
| 7,774,326 B2 | 8/2010 | Arrouye et al. | |
| 7,809,682 B2 | 10/2010 | Paterson et al. | |
| 7,885,925 B1 | 2/2011 | Strong et al. | |
| 7,917,628 B2* | 3/2011 | Hesselink et al. | 709/227 |
| 7,930,270 B2 | 4/2011 | Tsang | |
| 8,019,900 B1 | 9/2011 | Sekar et al. | |
| 8,321,374 B2 | 11/2012 | Holt et al. | |
| 8,612,439 B2* | 12/2013 | Prahlad et al. | 707/736 |
| 8,620,861 B1* | 12/2013 | Uhrhane et al. | 707/610 |
| 8,965,847 B1* | 2/2015 | Chang | G06F 17/30235 707/615 |
| 2002/0013852 A1 | 1/2002 | Janik | |
| 2002/0044159 A1 | 4/2002 | Kuroiwa et al. | |
| 2002/0059604 A1 | 5/2002 | Papagan et al. | |
| 2002/0065848 A1 | 5/2002 | Walker et al. | |
| 2002/0066050 A1 | 5/2002 | Lerman et al. | |
| 2002/0099772 A1 | 7/2002 | Deshpande et al. | |
| 2002/0129096 A1 | 9/2002 | Mansour et al. | |
| 2003/0004952 A1 | 1/2003 | Nixon et al. | |
| 2003/0014478 A1 | 1/2003 | Noble | |
| 2003/0131098 A1 | 7/2003 | Huntington et al. | |
| 2003/0159136 A1 | 8/2003 | Huang et al. | |
| 2003/0218633 A1 | 11/2003 | Mikhail et al. | |
| 2004/0024979 A1 | 2/2004 | Kaminsky et al. | |
| 2004/0044732 A1 | 3/2004 | Fushiki et al. | |
| 2004/0088420 A1 | 5/2004 | Allen et al. | |
| 2004/0148207 A1 | 7/2004 | Smith et al. | |
| 2004/0148375 A1 | 7/2004 | Levett et al. | |
| 2005/0044164 A1 | 2/2005 | O'Farrell et al. | |
| 2005/0091595 A1* | 4/2005 | Shappell | H04L 29/06 715/700 |
| 2005/0149481 A1 | 7/2005 | Hesselink et al. | |
| 2005/0165869 A1 | 7/2005 | Huang et al. | |
| 2006/0052091 A1 | 3/2006 | Onyon et al. | |
| 2006/0101053 A1 | 5/2006 | Proctor | |
| 2006/0156239 A1 | 7/2006 | Jobs et al. | |
| 2006/0168000 A1* | 7/2006 | Bodlaender | G06F 17/30176 709/205 |
| 2006/0184673 A1* | 8/2006 | Liebman | G06F 17/3028 709/225 |
| 2006/0242206 A1 | 10/2006 | Brezak et al. | |
| 2006/0259957 A1* | 11/2006 | Tam | G06F 21/10 726/3 |
| 2007/0005581 A1 | 1/2007 | Arrouye et al. | |
| 2007/0005707 A1* | 1/2007 | Teodosiu | G06Q 10/107 709/206 |
| 2007/0043830 A1 | 2/2007 | Housenbold et al. | |
| 2007/0156434 A1 | 7/2007 | Martin et al. | |
| 2007/0179989 A1 | 8/2007 | Maes | |
| 2007/0180075 A1 | 8/2007 | Chasman et al. | |
| 2007/0180084 A1* | 8/2007 | Mohanty | 709/223 |
| 2007/0198473 A1* | 8/2007 | Carrier | G06F 17/30067 |
| 2007/0209005 A1 | 9/2007 | Shaver et al. | |
| 2007/0250645 A1 | 10/2007 | Meadows et al. | |
| 2007/0276836 A1 | 11/2007 | Chatterjee et al. | |
| 2007/0294366 A1* | 12/2007 | Ozzie | G06F 17/30578 709/217 |
| 2008/0109448 A1 | 5/2008 | Aboel-Nil et al. | |
| 2008/0126936 A1 | 5/2008 | Williams | |
| 2008/0140732 A1* | 6/2008 | Wilson | G06F 17/3023 |
| 2008/0168185 A1 | 7/2008 | Robbin et al. | |
| 2008/0184125 A1* | 7/2008 | Suleiman et al. | 715/734 |
| 2008/0189627 A1 | 8/2008 | Nikitin et al. | |
| 2008/0195729 A1 | 8/2008 | Chand et al. | |
| 2008/0195739 A1* | 8/2008 | Ozzie | H04L 29/06 709/228 |
| 2008/0208870 A1 | 8/2008 | Tsang | |
| 2008/0250083 A1 | 10/2008 | Kovacs et al. | |
| 2008/0307504 A1* | 12/2008 | Cisler | H04L 63/0823 726/4 |
| 2009/0094252 A1 | 4/2009 | Wong et al. | |
| 2009/0183060 A1 | 7/2009 | Heller et al. | |
| 2009/0187609 A1 | 7/2009 | Barton et al. | |
| 2009/0327900 A1* | 12/2009 | Noll | G06F 9/468 715/733 |
| 2010/0063670 A1 | 3/2010 | Brzezinski et al. | |
| 2010/0115614 A1* | 5/2010 | Barile | G06F 21/552 726/22 |
| 2010/0205196 A1* | 8/2010 | Schreiber | G06Q 30/0273 707/758 |
| 2010/0241980 A1* | 9/2010 | Sosnosky | G06F 3/0486 715/769 |
| 2011/0010332 A1* | 1/2011 | Vasudevan | G06Q 10/10 707/608 |
| 2011/0106880 A1* | 5/2011 | Strong et al. | 709/203 |
| 2012/0084355 A1* | 4/2012 | Locker | G06F 8/60 709/204 |
| 2012/0197862 A1* | 8/2012 | Woytowitz et al. | 707/710 |
| 2013/0066975 A1* | 3/2013 | Kantor | G06F 21/335 709/205 |
| 2013/0117423 A1* | 5/2013 | Gupta et al. | 709/221 |
| 2013/0205251 A1* | 8/2013 | Cisler | G06F 17/30126 715/810 |
| 2013/0212486 A1 | 8/2013 | Joshi et al. | |
| 2013/0275509 A1* | 10/2013 | Micucci | H04L 67/02 709/204 |
| 2013/0282830 A1* | 10/2013 | Besen | G06F 17/30221 709/205 |
| 2013/0305039 A1* | 11/2013 | Gauda | G06F 21/6218 713/153 |
| 2013/0311598 A1* | 11/2013 | Arrouye | H04L 67/1097 709/217 |
| 2013/0311986 A1* | 11/2013 | Arrouye | G06F 8/61 717/175 |
| 2013/0318582 A1 | 11/2013 | McCann et al. | |
| 2016/0028811 A1 | 1/2016 | Rashid et al. | |

OTHER PUBLICATIONS

Ed Rhee, How to map a drive letter to Google Drive in Windows, May 3, 2012, p. 1-2.*

Ed Rhee, map a drive letter to Google Drive in Windows, May 3, 2012, pp. 1-2.*

U.S. Appl. No. 14/873,004, Oct. 26, 2017, Office Action.

U.S. Appl. No. 14/873,004, Feb. 9, 2018, Office Action.

* cited by examiner

SYSTEM, METHOD, AND COMPUTER PROGRAM FOR ENABLING A USER TO ACCESS AND EDIT VIA A VIRTUAL DRIVE OBJECTS SYNCHRONIZED TO A PLURALITY OF SYNCHRONIZATION CLIENTS

BACKGROUND OF THE INVENTION

1. Field of the Invention

This invention relates generally to a synchronization system and, more particularly, to a system and method for enabling a user to access and edit, via a virtual drive, objects synchronized to a plurality of synchronization clients.

2. Description of the Background Art

Many users have multiple computing devices, such as a home computer, a work computer, and a mobile phone. Different files may be stored by synchronization software clients on different devices. Virtual drives enable a user to back up files on a computer to a server and have remote access to files stored on the server, presented as though the files exist on a locally mounted file system. However, in a synchronization system, a user may have synchronized an object to multiple clients, and known virtual drives do not enable a user to make a change to a remote file and then have that change automatically synchronized across multiple clients. As an example, User A has a folder that resides on his work and home computer. User A has also shared that folder with User B. User A desires not only to be able to remotely access the folder from another synchronization software client via a virtual drive, but also to have any changes made to the folder via the virtual drive automatically synchronized to his home and work computer, as well as any client devices of User B that have a corresponding copy of the folder. Therefore, there is a need for a system and method for enabling a user to access and edit via a virtual drive objects synchronized to a plurality of synchronization clients.

SUMMARY OF THE INVENTION

The present invention is directed to a synchronization system, method, and computer program for enabling a user to access and edit, via a virtual drive, local and remote objects, including objects synchronized to a plurality of synchronization software clients. The present invention enables a user to make a change to an object via a virtual drive and have that change automatically synchronized to a plurality of synchronization clients.

The method includes enabling a user to synchronize one or more objects using a synchronization software client, a synchronization server, and other synchronization clients. Objects may be folders, music files, video files, images, contacts, calendar items, and other types of electronic files or items. All objects, across a plurality of synchronization clients that a user has synchronized to the synchronization server, are identified. A virtual drive is displayed on the user's local client device with the identified objects. The virtual drive appears as a separate disk drive on the user's local client device and includes objects that reside on one or more remote clients. A user is able to access and edit any object displayed in the virtual drive, including objects that reside only on remote clients. In response to detecting a change in an object in the virtual drive, the object is updated on the synchronization server. All remote synchronization clients of the user are identified in the synchronization system, as well as all remote synchronization clients, if any, of other users whom have access to the changed object. The identified synchronization clients are notified of the change to the object. In response to the change being a change to content within the object, the content of the object is automatically updated on any identified remote clients that have a corresponding object.

In certain embodiments, a user is able to create a collection that comprises items across a plurality of synchronization clients that share one or more specified attributes, regardless of the folder(s) in which the items reside. The collection is displayed in the virtual drive. A user is able to access and edit items within the collection. In response to a user editing an item within a collection, a folder is identified in which the item resides. The folder is updated on the synchronization server with the edit to the item. All remote synchronization clients of the user in the synchronization system are identified, as well as all remote synchronization software clients, if any, of other users whom have access to the changed folder. The identified clients are notified of the change to the folder. In response to the change being a change to content within the folder, the content of the folder is automatically updated on any identified remote clients that have a corresponding folder. In certain embodiments, the items in the collection are not limited to files organized within folders on a file system, but are arbitrary objects existing within an arbitrary organizational scheme.

The attributes may be specified by the user, other software programs, or the synchronization system. The attributes may include one or more of the following: location associated with the file, version of the file, a time stamp associated with the file, client device on which the file resides, and the file type. The attributes may include a permission class associated with the shared files.

In one embodiment the user is able to perform share and synchronization functions via the virtual drive. The folders in the virtual drive may be organized by client device or may be client device-independent.

DETAILED DESCRIPTION OF THE PREFERRED EMBODIMENTS

Figure 1A:
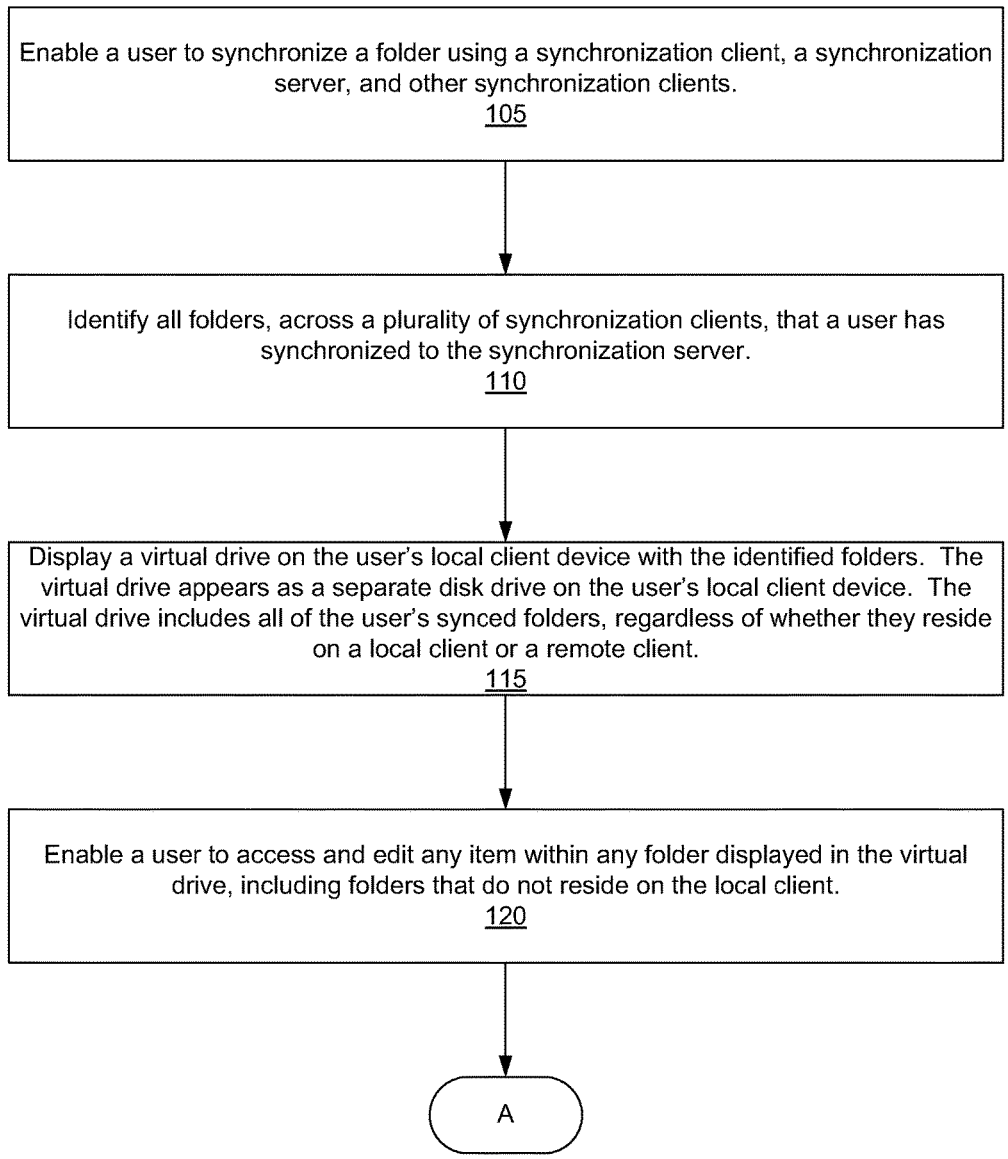
FIGS. 1a-1b are a flowchart that illustrates a method, according to one embodiment of the invention, for enabling a user to access and edit, via a virtual drive, local and remote objects, including objects synchronized to a plurality of synchronization software clients.

The present invention provides a system, method, and computer program for enabling a user to access and edit, via a virtual drive, local and remote objects in a synchronization system, including objects synchronized to a plurality of synchronization software clients. Examples of synchronization systems are disclosed in (i) U.S. Pat. No. 7,885,925, titled "Method and Apparatus for File Sharing and Synchronization System," and (ii) U.S. Pat. No. 8,019,900, titled "Opportunistic Peer to Peer Synchronization in a Synchronization System." The contents of both of these patents are incorporated herein by reference as if fully disclosed herein. A person skilled in the art would understand that other synchronization systems may be used within the scope of the present invention.

As used herein, a virtual drive is a file system representation on the user's local client device, of data from a source that is external to the local file system. In the present invention, the virtual drive provides a file system representation, on the user's local client device, of all objects, across a plurality of clients including the local client, which a user has synchronized or otherwise saved to the synchronization system. In the preferred embodiment, a local sync database stores metadata about these objects, and this metadata is used to generate the virtual drive. As used herein, metadata is a collection of attributes that describe the state of an object and is used by the synchronization system to detect and orchestrate changes to the object.

As used herein, an object may be a folder, a file (e.g., a WORD document, an EXCEL spreadsheet, a POWERPOINT presentation, an email, contact, or calendar item, such as in MICROSOFT OUTLOOK), a media object (e.g., a video file, an audio or music file, an image file), or a collection. A person skilled in the art would understand that objects are not limited to the above-specified examples.

As used herein, a collection includes items, across a plurality of synchronization software clients, which share one or more specified attributes. An attribute is a property that the user can assign to any object or collection (e.g., client name). An attribute has an attribute value (i.e., the value that a user might assign to an attribute) and an attribute type (i.e., the data type of the attribute value). One example of a collection may be the user's recent photographs from Hawaii that are stored across the user's camera, mobile device, laptop, and home computer. Attributes may be specified automatically by the synchronization system, by another software program, or by the user. Types of attributes available for specification by the user include (i) permission class associated with a shared object, (ii) a file type associate with a file, (iii) a location associated with an object, (iv) version of the file, (v) time stamp associated with the file, (vi) client device on which the file resides, and (vii) an arbitrary attribute type defined by the user or other software program. A person skilled in the art would understand that other attributes may be assigned within the scope of the present invention.

Figure 1B:
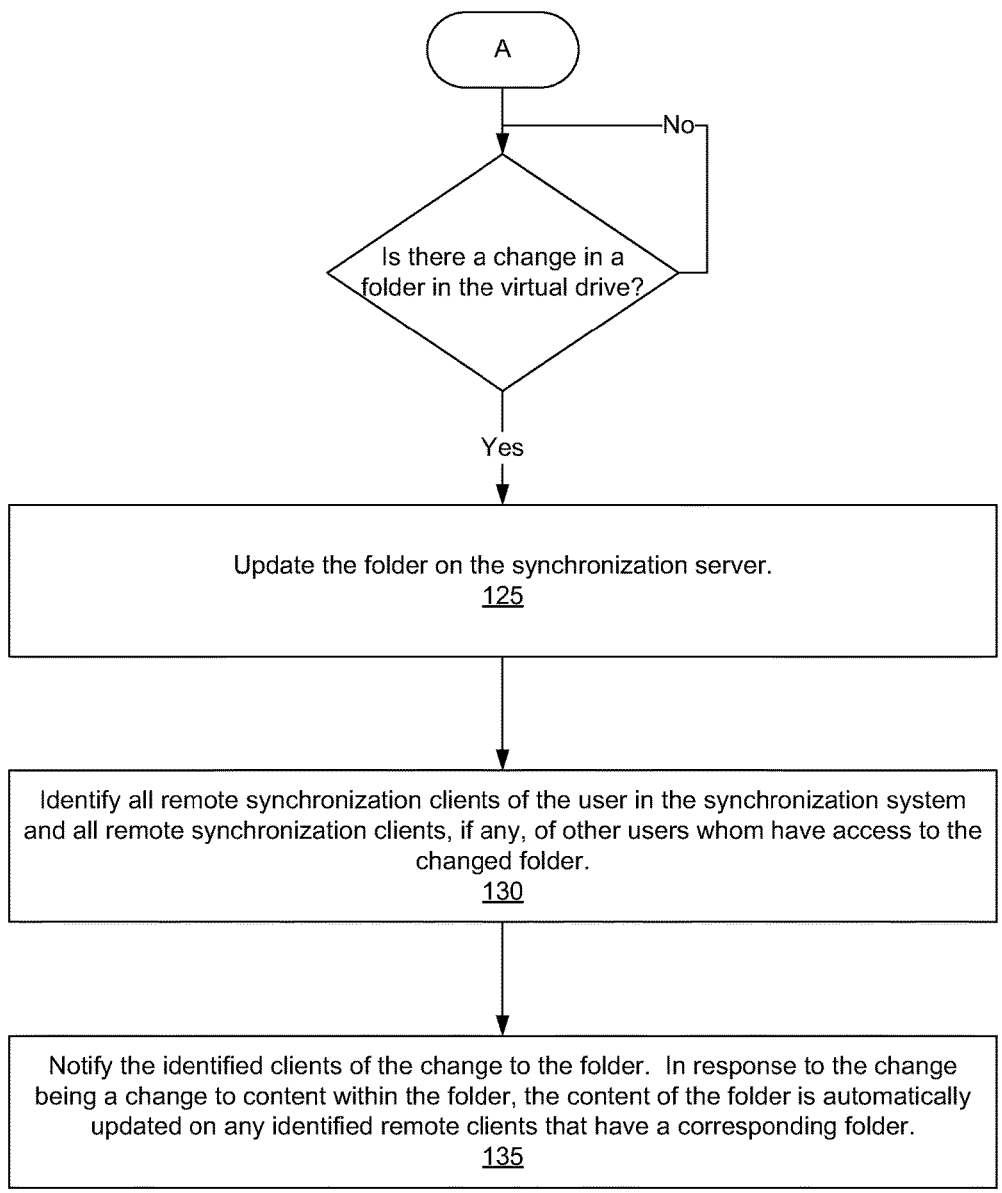

FIGS. 1a-1b illustrate a method, according to one embodiment, for enabling a user to access and edit, via a virtual drive, local and remote objects in a synchronization system, including objects synchronized to a plurality of synchronization clients. In the preferred embodiment, the objects are folders that may contain documents (e.g., EXCEL, POWERPOINT, or WORD documents), email/calendar items, video files, and/or photos, but those skilled in the art will appreciate that the method of the present invention may be applied to other objects.

Referring to FIG. 1a, a user is enabled to synchronize one or more folders on any synchronization client to the synchronization server and other synchronization clients (step 105). All folders, across a plurality of synchronization clients that a user has backed up or synchronized to the synchronization server, are identified, as well as any folders that the user shares with other users (step 110). Each of the synchronization clients stores metadata with information on all folders shared with or by the user and all folders that the user has backed up or synced to the synchronization server (including the contents of the folder). The synchronization client on the client device uses this metadata to generate the virtual drive and the user interface.

A virtual drive is displayed on the user's local client device with the identified folders (step 115). The virtual drive appears as a separate disk drive on the user's local client device. The virtual drive includes all of the user's synced folders, regardless of whether a folder resides on the local client or only on a remote client. A user is enabled to access and edit any item within any folder displayed in the virtual drive, including folders that do not reside on the local client (step 120). In one embodiment, when a user double clicks on a file or item in a remote folder in the virtual drive, the server downloads its copy of the file/item to the local synchronization software client (i.e., the client currently being used by the user). The user can then edit the file/item as desired. In one embodiment, when a user double clicks on a local folder, the user is taken to the folder in the local file system view. In another embodiment, the server downloads its copy of the item/file in the local computer.

In response to detecting a change in a folder in the virtual drive, the folder is updated on the synchronization server (step 125). All remote clients of the user in the synchronization system are identified, as well as all remote synchronization clients, if any, of other users whom have access to the changed folder (step 130). In one embodiment, all synchronization clients that have an interest in updates to the folder "register" for notices of changes to the folder. The identified clients are notified of the change to the folder (step 135). In response to the change being a change to content within the folder, the content of the folder is automatically updated on any identified remote clients that have a corresponding folder. In one embodiment, the synchronization server first sends metadata to all the identified clients, notifying them of the change. The synchronization clients that have their own copy of the changed folder will then request the applicable file data from the server and the server will download the requested file data to the requesting synchronization clients.

Figure 1C:
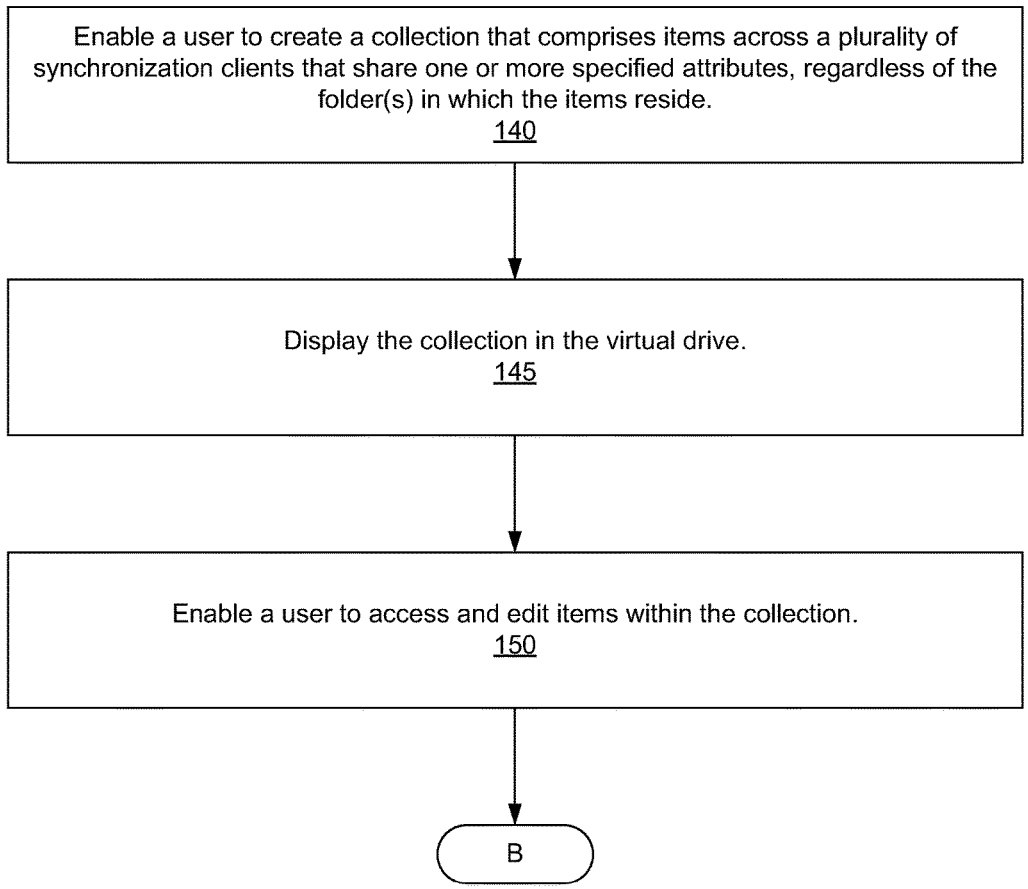
FIGS. 1c-1d are a flowchart that illustrates a further embodiment of the invention in which a user is able to view, access, and synchronize collections via a virtual drive.
Figure 1D:
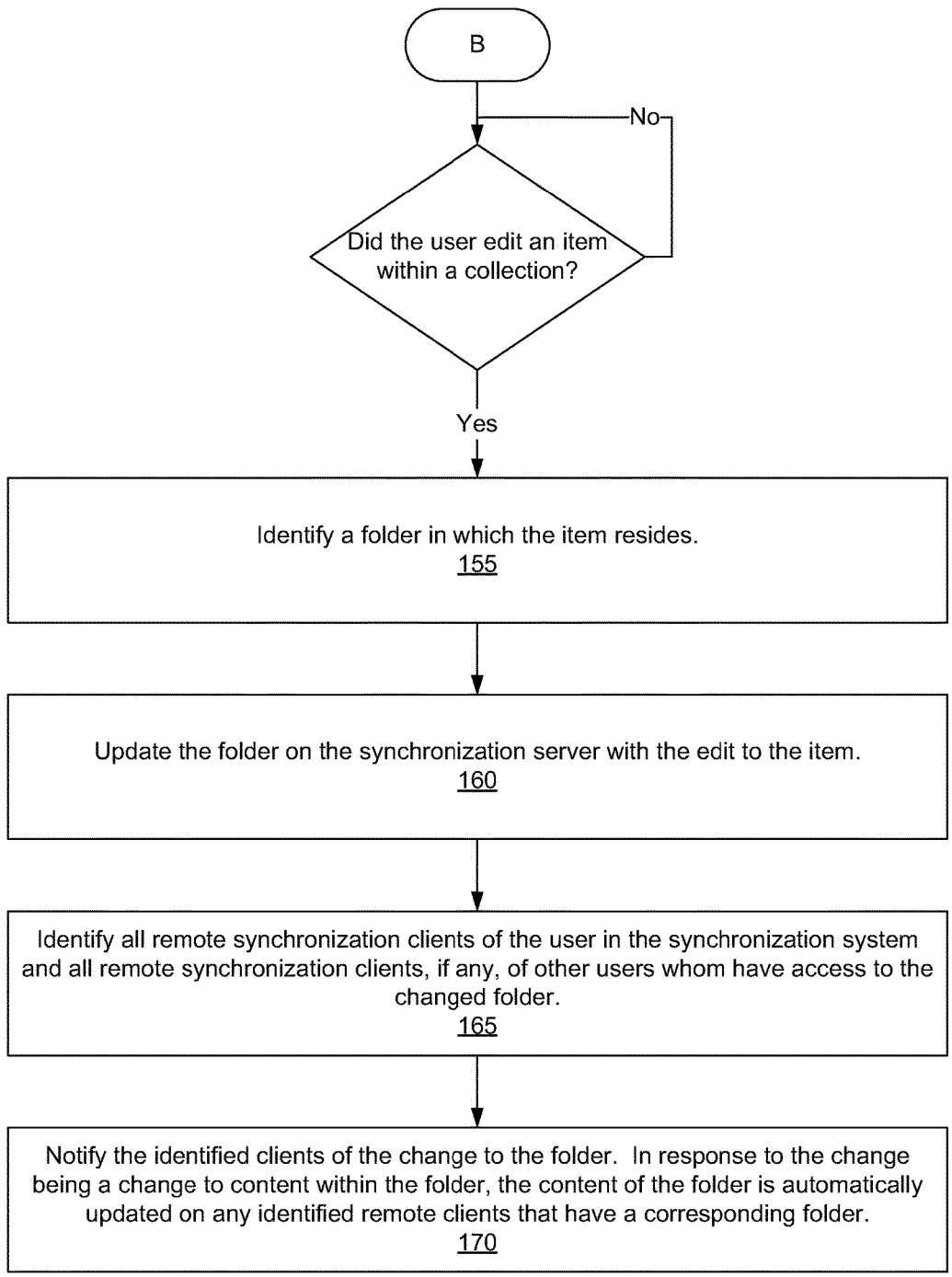

FIGS. 1c-1d illustrate a further embodiment of the invention. In this embodiment, a user is enabled to create a collection that comprises items across a plurality of synchronization clients that share one or more specified attributes, regardless of the folder(s) in which the items reside (step 140). In certain embodiments, the collections and items within collections are not limited to files organized within folders on a file system, but are arbitrary objects existing within an arbitrary organizational scheme within an arbitrary data set.

The collection is displayed in the virtual drive (step 145). The collection may be displayed in the virtual drive as a folder, as a file, or as an object (e.g., a node). A user is enabled to access and edit items within the collection (step 150). In response to a user editing an item within a collection, a folder is identified in which the item resides (step 155). The folder is updated on the synchronization server with the edit to the item (step 160). All remote clients of the user in the synchronization system and all remote synchronization clients, if any, of other users whom have access to the changed folder are identified (step 165). The identified clients are notified of the change to the folder (step 170). In response to the change being a change to content within the folder, the content of the folder is automatically updated on any identified remote clients that have a corresponding folder. In the case where the items in the collection reside across an alternate organizational scheme (other than a file or folder system), the identified clients are notified of changes to any item. In response to the change being a change to content within the original physical or logical location, the content of the item is automatically updated on any identified remote clients that have a corresponding representation of the item.

The virtual drive may be organized by client device or may be client device-independent. A user may be able to perform share and synchronization management functions via the virtual drive. For example, a user may be able to right click on an object in the virtual drive to take a specific share action (e.g., share an object with another user or change the permission settings for another user with respect to the object) or alter the synchronization settings for the folder.

Figure 2:
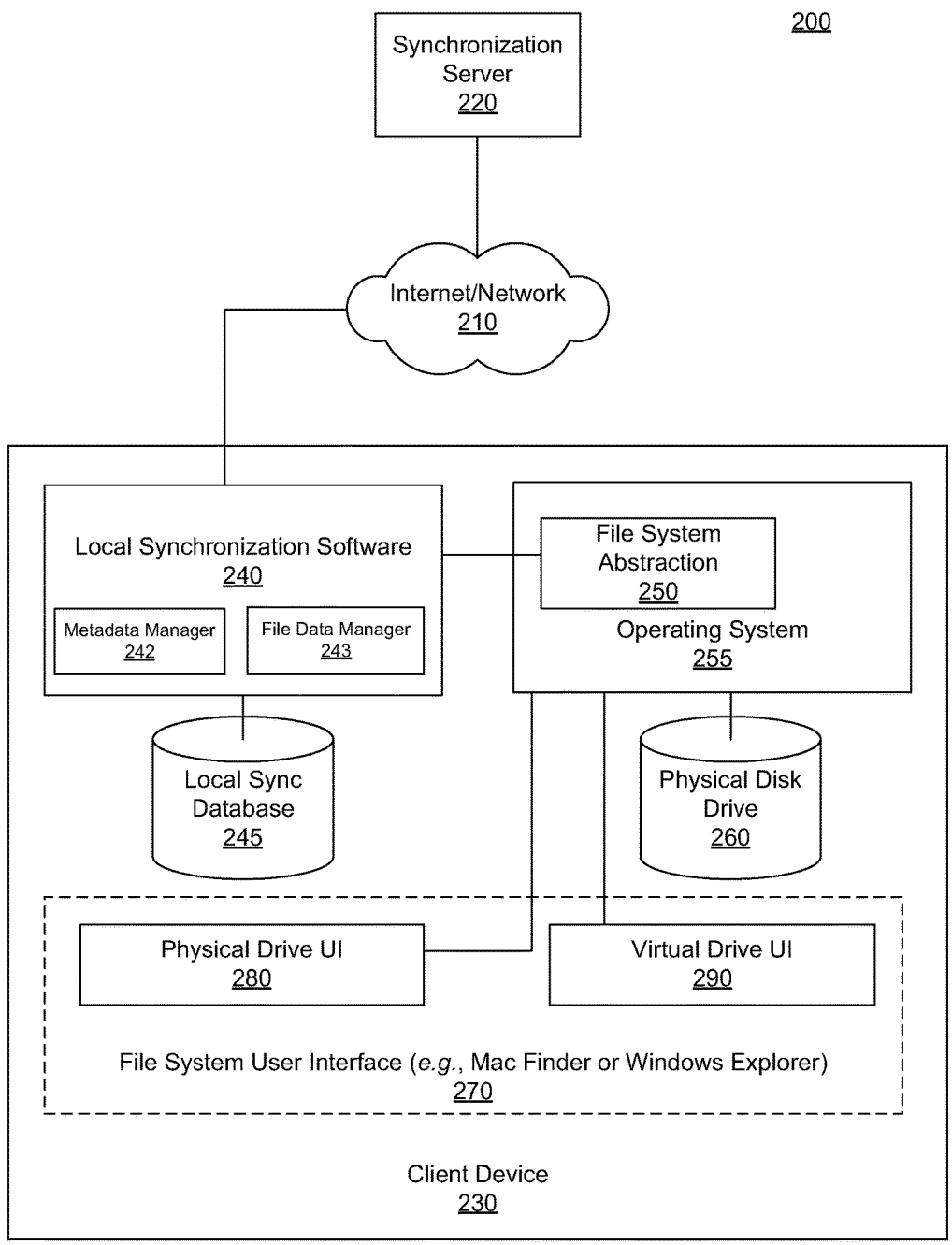
FIG. 2 is a block diagram of a synchronization system according to one embodiment of the invention.

FIG. 2 illustrates an exemplary synchronization system 200 according to one embodiment. As a person skilled in the art would understand, the synchronization system 200 may be constructed in any number of ways within the scope of the present invention. The methods of FIGS. 1a-1d may be implemented in other systems, and the invention is not limited to system 200.

Synchronization system 200 includes a synchronization server (i.e., internet/network) 220, which provides synchronization and back up services to a plurality of end users. For example, all synchronized objects between a user's client devices and between users are stored on server 220 and are accessible from any client device having access to the server 220. Synchronization server 220 is representative of the server-side of a synchronization system and, in a large synchronization system, is likely a plurality of synchronization servers networked together. A person skilled in the art would understand that the synchronization system 200 may have any number of client devices, including one or more desktops, laptops, and mobile devices.

When a synchronization software client in the synchronization system detects a change to a local object, it notifies the synchronization server 220 of the change, and synchronization server 220 then modifies the corresponding object (and/or metadata related to the corresponding object) on the server as applicable. Server 220 notifies the user's other synchronization clients of the change, as well as any clients of other users with access to the changed object. If the content of the object has changed and a synchronization software client has a corresponding copy of the changed object, the synchronization software client requests the applicable content data from synchronizations sever 220.

Within client device 230 is local synchronization client software 240, which functions to synchronize client device 230 with the synchronization server 220. The local synchronization software 240 has a metadata manager 242 for receiving and sending change notices to and from synchronizations server 220. The metadata manager stores metadata about objects the user has synchronized or backed up to server 220 in the local sync database 245. Metadata for objects other users have shared with the user is also stored in the local sync database 245.

The local synchronization client software 240 includes a file data manager 243 for monitoring synchronized files (via operating system 255) on physical disk drive 260. Physical disk drive 260 stores the user's local files. When a user accesses a remote file via the virtual drive, a copy of such file is temporarily stored on a local physical disk drive 260. The file data manager 243 informs the metadata manager 242 if it detects a change to a synchronized object in physical disk drive 260. The metadata manager 242 then updates the applicable metadata in local sync database 245 and notifies server 220 of the change.

The local synchronization software 240 is operatively coupled to a file system abstraction module 250, within operating system 255. The operating system 255 is connected to one or more disk drives 260. The operating system 255 is also connected to a user interface 270 (e.g., MAC FINDER or WINDOWS EXPLORER) which displays the physical drive user interface 280 and the virtual drive user interface 290. The file system abstraction module 250 functions to process and normalize the metadata related to the synchronized objects so that the file system user interface module 270 is able to display the virtual drive 290.

The methods described with respect to FIGS. 1a-1d are embodied in software and performed by a computer system executing the software. A person skilled in the art would understand that a computer system has a memory or other physical, computer-readable storage medium for storing software instructions and one or more processors for executing the software instructions.

Figure 3:
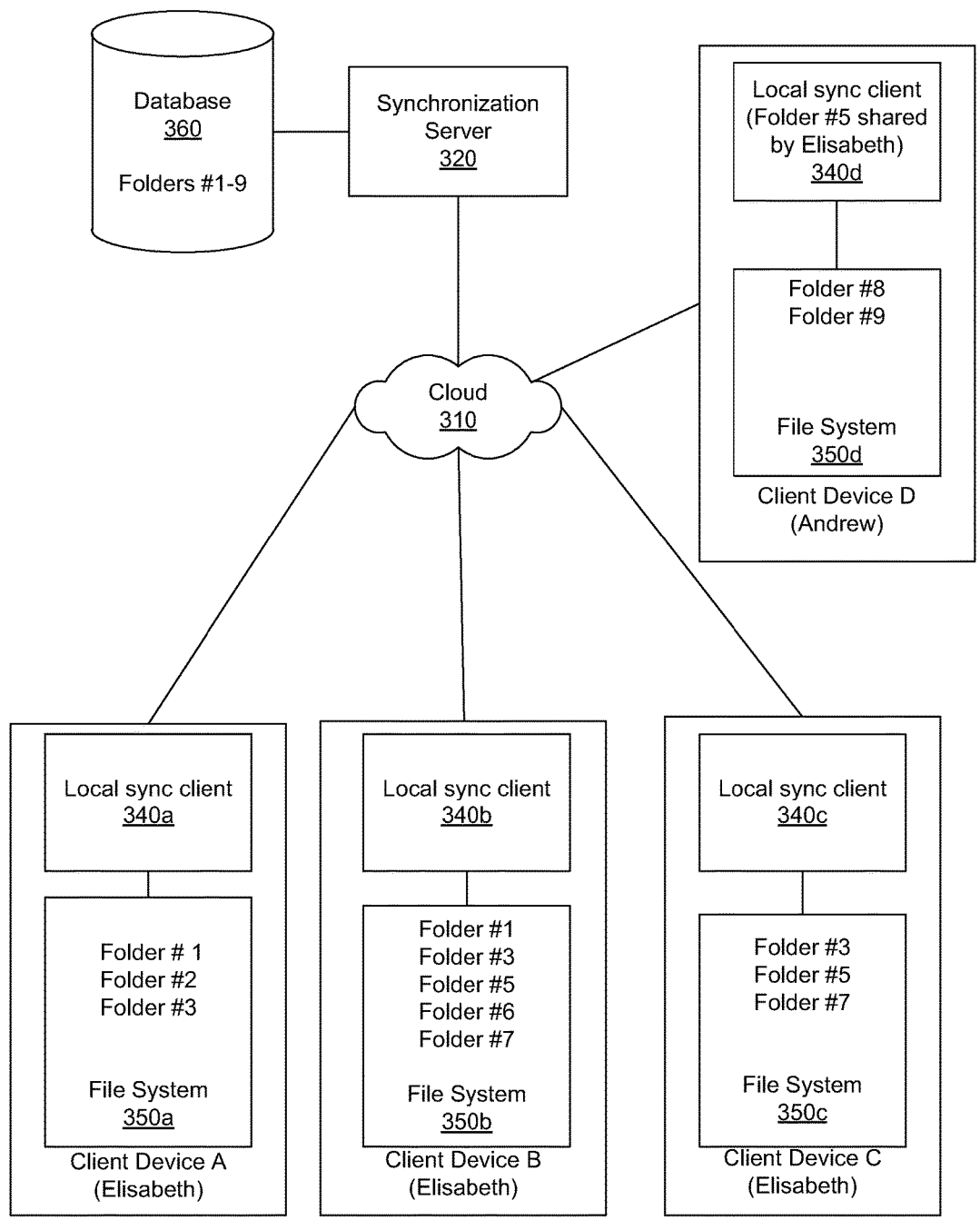
FIG. 3 is a block diagram of a synchronization system according to one embodiment of the invention.
Figure 4A:
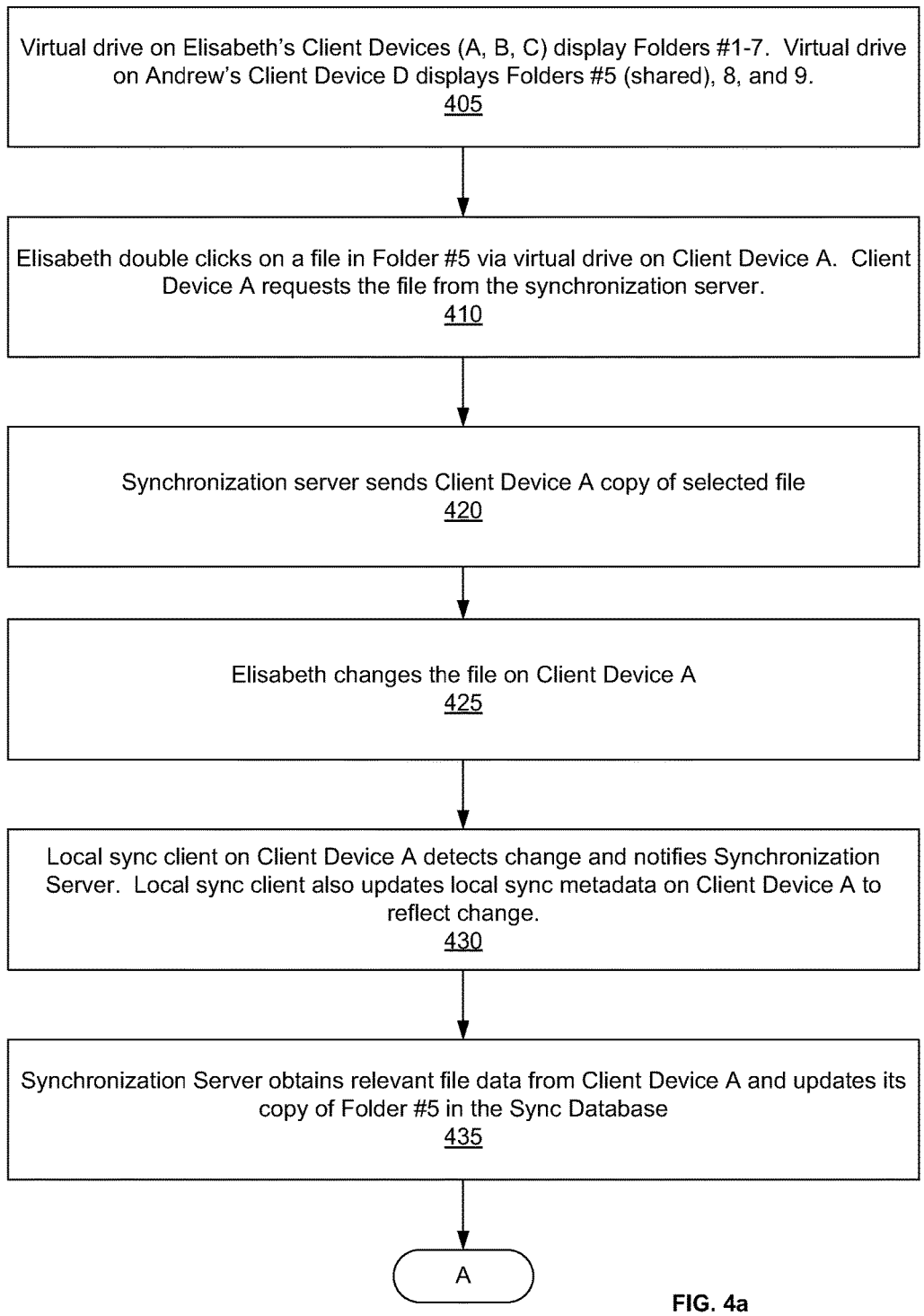
FIGS. 4a-4b are a flowchart that illustrates a method for enabling a user to change a remote folder via the virtual drive according to one embodiment of the invention.
Figure 4B:
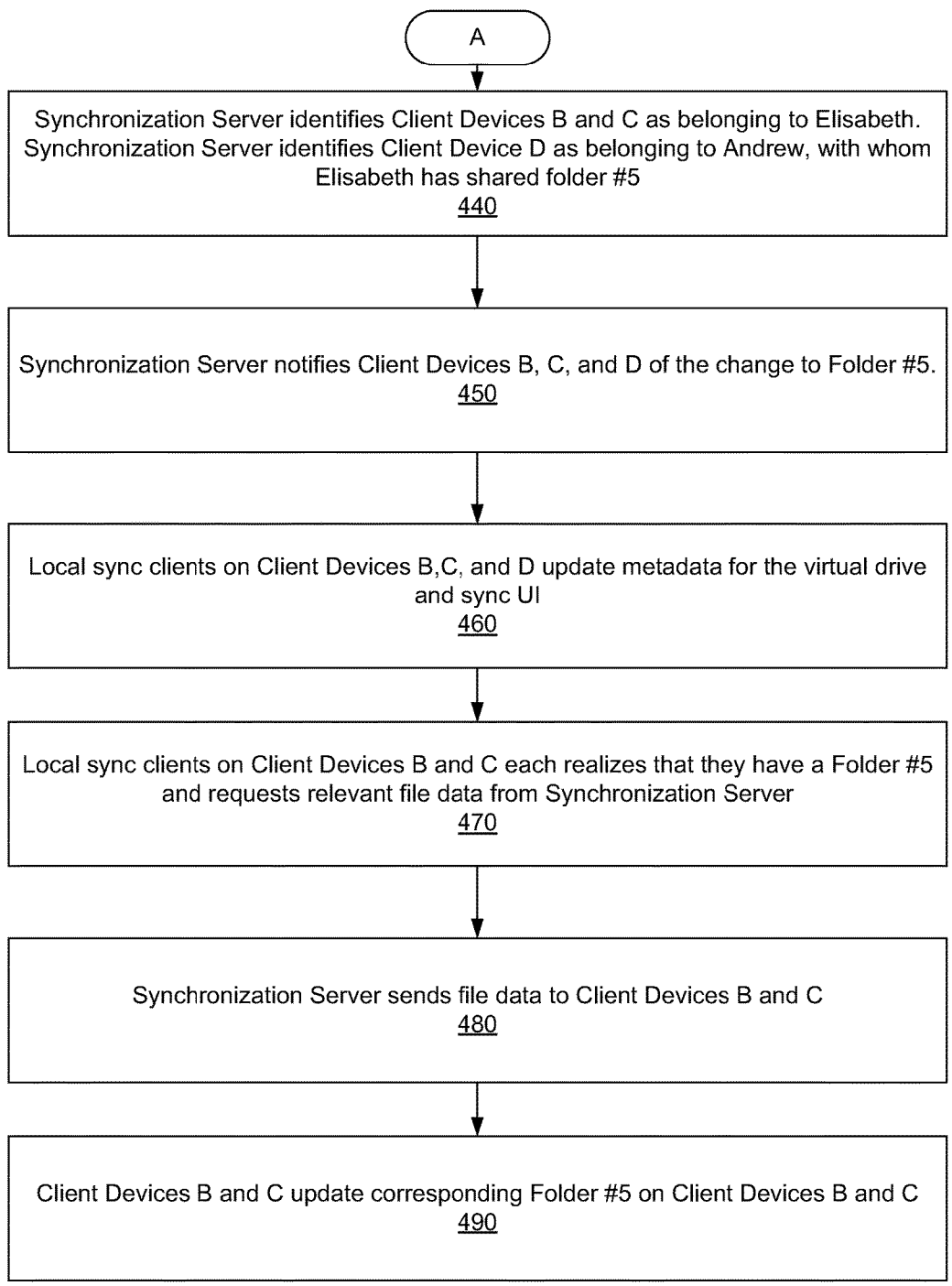

FIGS. 3-4b illustrate a method for enabling a user to change a remote folder via the virtual drive according to one embodiment of the invention. The same method may be applied if a user changes a local folder. In FIG. 3, a synchronization server 320 communicates, via Internet/network 310, to four client devices, Client Device A, Client Device B, Client Device C, and Client Device D. Client Devices A-C belong to a first user (e.g., Elisabeth) and Client Device D belongs to a second user (e.g., Andrew). A person skilled in the art would understand that there may be more or less client devices connected to the cloud 310 within the scope of the present invention.

Each client device has a local synchronization client 340a-340d and a file system 350a-350d. Each file system stores one or more of Folders #1-9 on the local client device. For example, Client Device A has Folders #1-3 in its file system 350a, Client Device B has Folders #1, 3, and 5-7 in its file system 350b, Client Device C has Folders #3, 5, and 7 in its file system 350c, and Client Device D has Folders #8-9 in its file system 350d. In addition, the first user, Elisabeth, has shared Folder 5 with the second user, Andrew, which appears on the local synchronization client 340d of Client Device D. Database 360 is connected to synchronization server 320 and has all folders (i.e., Folders #1-9) of all synchronized client devices stored on it.

In FIGS. 4a-4b, the virtual drives on Elisabeth's Client Devices (A, B, C) display Folders #1-7. The virtual drive on Andrew's Client Device D displays Folders #5 (shared), 8, and 9 (step 405). Elisabeth double clicks on a file in Folder #5 via the virtual drive on Client Device A, and Client Device A requests a copy of the file from the synchronization server 320 (step 410). The synchronization server 320 sends Client Device A a copy of the selected file (step 420). Elisabeth changes the file on Client Device A (step 425). The local synchronization client 340a on Client Device A detects a change and notifies the synchronization server 320. The local synchronization client 340a also updates the local sync metadata on Client Device A to reflect change (step 430). Examples of metadata include file attributes (e.g., permissions, time stamp of last change, file type, file name). The synchronization server 320 obtains the relevant file data from Client Device A and updates its copy of Folder #5 in the Synchronization Database 360 (step 435).

The synchronization server 320 identifies Client Devices B and C as belonging to Elisabeth. Synchronization server 320 identifies Client Device D as belonging to Andrew, with whom Elisabeth has shared Folder #5 (step 440). Synchronization server 320 notifies Client Devices B, C, and D of the change to Folder #5 (step 450). The local synchronization clients 340b, 340c, 340d on Client Devices B, C, and D update the metadata for the virtual drive and synchronization user interface (step 460). The local synchronization clients 340b, 340c, 340d on Client Devices B and C each realizes that they have a Folder #5 and requests relevant file data from synchronization server 320 (step 470). The synchronization server 320 sends file data to Client Devices B and C (step 480). Client Devices B and C update corresponding Folder #5 on Client Devices B and C (step 490).

Figure 5:
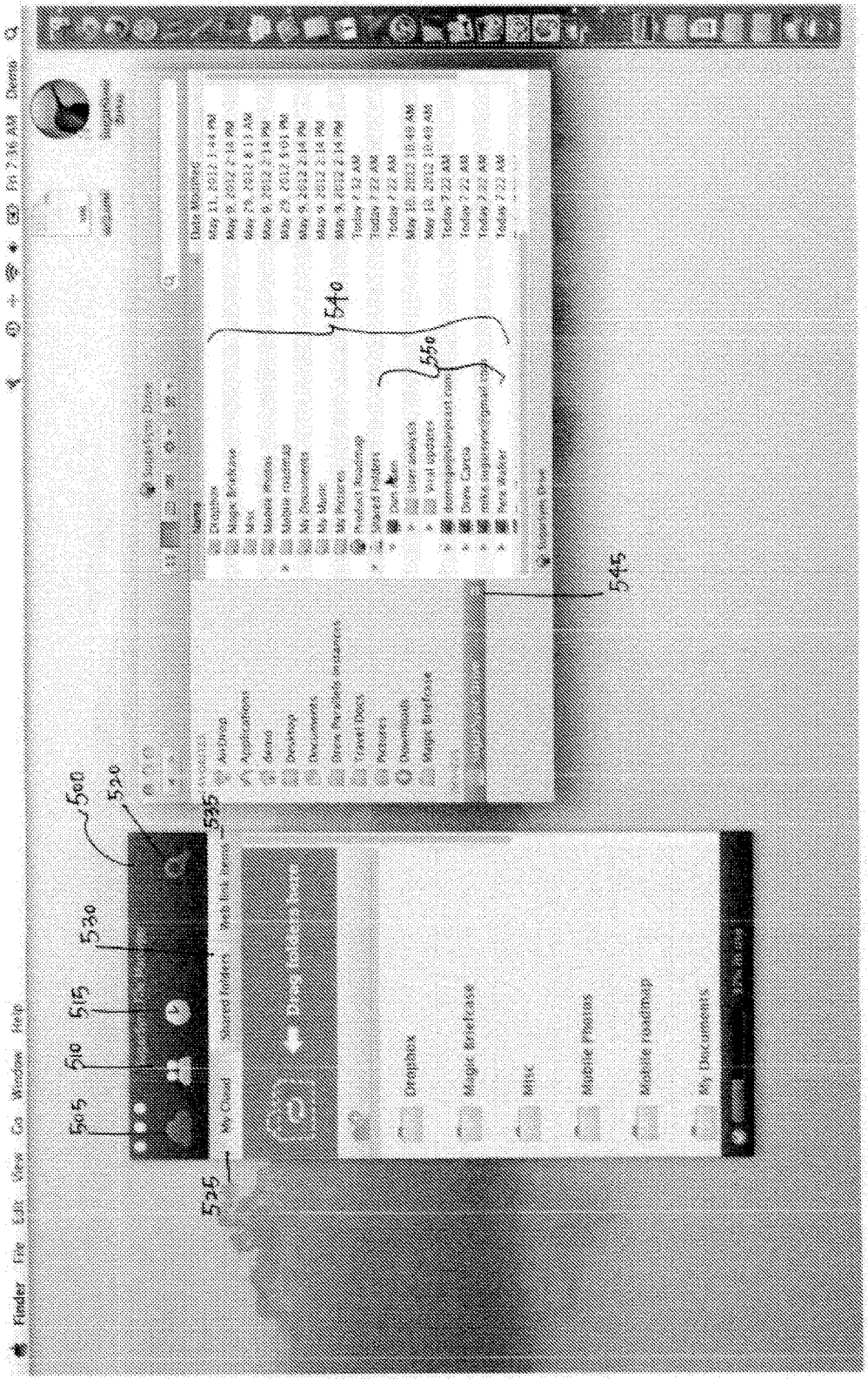
FIGS. 5-6 are screenshots of an exemplary user interface in a synchronization system according to one embodiment of the invention.
Figure 6:
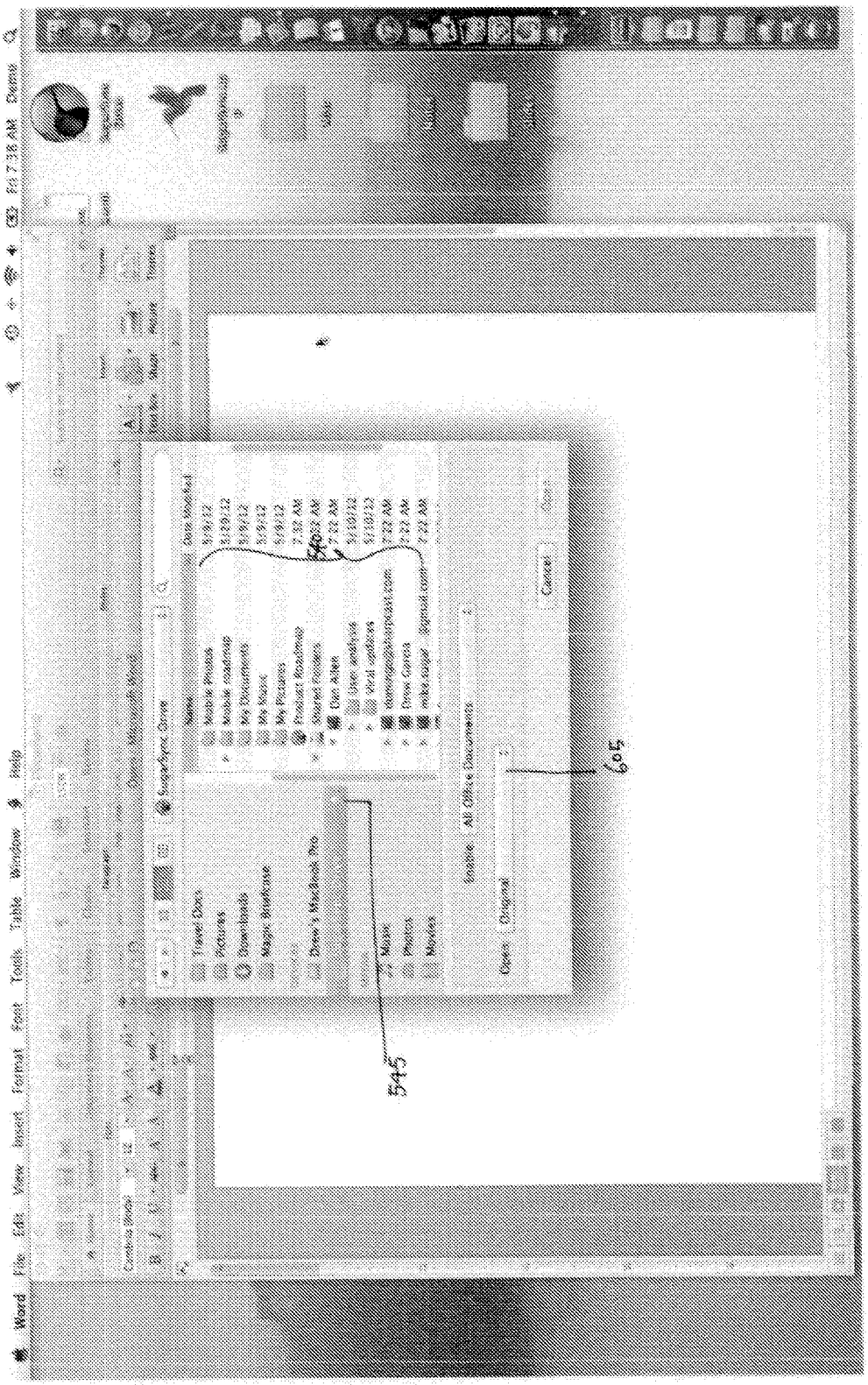

FIGS. 5-6 illustrate screenshots of an exemplary user interface that enables a user to easily synchronize a folder to the synchronization system. A person skilled in the art would understand that the present invention may be embodied on other user interfaces having more or less functionality within the scope of the present invention. As such, FIGS. 5-6 are intended to be illustrative and not limiting in any way.

In FIG. 5, an exemplary user interface 500 for a synchronization system that functions with the virtual drive is provided. The user interface has a content view 505, a sharing view 510, an activity view 515, and a search button 520. The content view 505 has three tabs, a My Cloud tab 525, a Shared folders tab 530, and a Web link tab 535. A more detailed description of an exemplary user interface 500 may be found in U.S. patent application Ser. No. 13/571,564, filed on Aug. 10, 2012, by Andrew Garcia, et al. entitled "System, Method, and Computer Program for Enabling a User to Synchronize, Manage, and Share Folders Across a Plurality of Client Devices and a Synchronization Server," which is incorporated by reference in its entirety.

FIG. 5 also illustrates a virtual drive on an exemplary file system user interface, such as the MAC FINDER on a MACINTOSH-based computer. The virtual drive may also be embodied on a WINDOWS-based computer, such as using WINDOWS EXPLORER. Folders 540 include folders, across the synchronization software clients of the user's client devices, that (i) the user has synchronized or backed up in the synchronization system, (ii) have been shared with the user, or (iii) the user has shared with other users. Any file in folders 540 may be accessed through the virtual drive 545, including files in folders located only on a remote synchronization software client or synchronization server 220. That means that the folders 540 may be viewed as if they resided on the hard drive of the local client device and the user may add, edit, delete, and move files within the folders 540, which would result in the files being added, edited, deleted, or moved in corresponding folders on remote synchronization software clients and the synchronization server. Not only are all of the user's folders, which have been synchronized, accessible through the virtual drive, but all of the folders 550 shared with the user by other users.

FIG. 6 illustrates how a file may be opened via the virtual drive 545. The user can choose a file from any folder 540 in the virtual drive 545. The user may choose whether to open the original or a copy 605. After the user modifies and saves the document, any changes are uploaded to the synchronization server 220 and a copy of the changed metadata is pushed to all synchronization software clients that have registered for notices of changes to the folder.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for accessing and editing local and remote folders via a virtual drive, the method comprising:
   identifying one or more folders across a plurality of synchronization clients that a user has synchronized to a synchronization server;
   displaying, on a local client device associated with the user, the virtual drive comprising the identified one or more folders, wherein the virtual drive is displayed as a device on the local client device;
   displaying, in the virtual drive, an object representing a collection that comprises:
      a first item and a second item that share an attribute comprising a permission class associated with the first item and the second item and one or more of a location associated with a file, a version of file, a time stamp associated with a file, a client device of the plurality of synchronization clients on which a file resides, or a file type, wherein the first item residing in a first folder from the identified folders stored on a first synchronization client of the plurality of synchronization clients and the second item residing in a second folder from the identified folders stored on a second synchronization client of the plurality of synchronization clients, wherein the second item is not stored on the first synchronization client and the second synchronization client is controlled by a different user;
   displaying, in the virtual drive, the identified one or more folders in accordance with one of a plurality of views, wherein the plurality of views comprises a content view, a sharing view and an activity view;
   enabling the user to access and edit any item within any of the identified one or more folders displayed in the virtual drive, including the first item and second item within the displayed collection and folders that do not reside on the local client device;
   enabling the user to perform, via the virtual drive, one or more share-and-synchronization management functions to modify the permission class attribute associated with the first item and the second item displayed in the virtual drive; and
   in response to the user editing the first item and the second item in the virtual drive, notifying the synchronization server of the edit to the first item and the second item.

2. The method of claim 1, wherein the identified folders are organized by synchronization client in the virtual drive.

3. The method of claim 1, wherein the identified folders are displayed in a synchronization client-independent view in the virtual drive.

4. The method of claim 1, further comprising:
   uploading, in response to the user adding a new item to a folder from the identified folders, the new item to the synchronization server; and
   automatically updating the corresponding folder on each of the plurality of synchronization clients with the new item.

5. The method of claim 4, further comprising:
   receiving, by a synchronization client, the new item; and
   automatically updating, by the synchronization client, the identified folder with the new item.

6. The method of claim 1, further comprising: displaying, in the virtual drive, folders of the identified folders that the user shares with another user.

7. The method of claim 1, further comprising:
   receiving, by a synchronization client, at least one of:
      data relating to a change to the first item, or a notification of a change to metadata related to the first item.

8. A system for accessing and editing local and remote objects via a virtual drive, the system comprising:
   at least one processor; and
   a computer readable storage medium comprising instructions that, when executed by the at least one processor, causes the system to:
   identify one or more objects across a plurality of synchronization clients that a user has synchronized to a synchronization server, wherein the identified one or more objects comprises of one or more folders;
   display, on a local client device associated with the user, the virtual drive comprising the identified one or more objects, wherein the virtual drive is displayed as a device on the local client device;
   display, in the virtual drive, a representation of a collection that comprises:
      a first item and a second item that share an attribute comprising a permission class associated with the first item and the second item and one or more of a location associated with a file, a version of a file, a time stamp associated with a file, a client device of the plurality of synchronization clients on which a file resides, or a file type, wherein the first item residing in a first object from the identified objects stored on a first synchronization client of the plurality of synchronization clients and the second item residing in a second object from the identified objects stored on a second synchronization client of the plurality of synchronization clients, wherein the second item is not stored on the first synchronization client and the second synchronization client is controlled by a different user;
   display, in the virtual drive, the identified one or more objects in accordance with one of a plurality of views, wherein the plurality of views comprises a content view, a sharing view and an activity view;
   enable the user to access and edit any item within any of the identified one or more objects displayed in the virtual drive, including the first item and second item within the displayed collection and objects that do not reside on the local client device;
   enable the user to perform, via the virtual drive, one or more share-and-synchronization management functions to modify the permission class attribute associated with the first item and the second item displayed in the virtual drive; and
   in response to the user editing the first item and the second item in the virtual drive, notify the synchronization server of the edit to the first item and the second item.

9. The method of claim 8, wherein the first item and second item include music files.

10. The method of claim 8, wherein the first item and second item include video files.

11. The method of claim 8, wherein the first item and the second item include images.

12. The method of claim 8, wherein the first item and the second item include contacts and calendar items.

13. The method of claim 8, further comprising: displaying, in the virtual drive, objects of the identified objects that the user shares with another user.

14. A non-transitory computer-readable medium storing computer-executable instructions that, when executed by one or more computer processors, cause a computer device to:
   identify one or more folders across a plurality of synchronization clients that a user has synchronized to a synchronization server;
   display, on a local client device associated with the user, a virtual drive comprising the identified one or more folders, wherein the virtual drive is displayed as a device on the local client device;
   display, in the virtual drive, an object representing a collection that comprises:
      a first item and a second item that share an attribute comprising a permission class associated with the first item and the second item and one or more of a location associated with a file, a version of a file, a time stamp associated with a file, a client device of the plurality of synchronization clients on which a file resides, or a file type, wherein the first item residing in a first folder from the identified folders stored on a first synchronization client of the plurality of synchronization clients and the second item residing in a second folder from the identified folders stored on a second synchronization client of the plurality of synchronization clients, wherein the second item is not stored on the first synchronization client and the second synchronization client is controlled by a different user;
   display, in the virtual drive, the identified one or more folders in accordance with one of a plurality of views, wherein the plurality of views comprises a content view, a sharing view and an activity view;
   enable the user to access and edit any item within any of the identified one or more folders displayed in the virtual drive, including the first item and second item within the collection and folders that do not reside on the local client device;
   enable the user to perform, via the virtual drive, one or more share-and-synchronization management functions to modify the permission class attribute associated with the first item and the second item displayed in the virtual drive; and
   in response to the user editing the first item and the second item in the virtual drive, notify the synchronization server of the edit to the first item and the second item.

* * * * *